Patented Aug. 5, 1924.

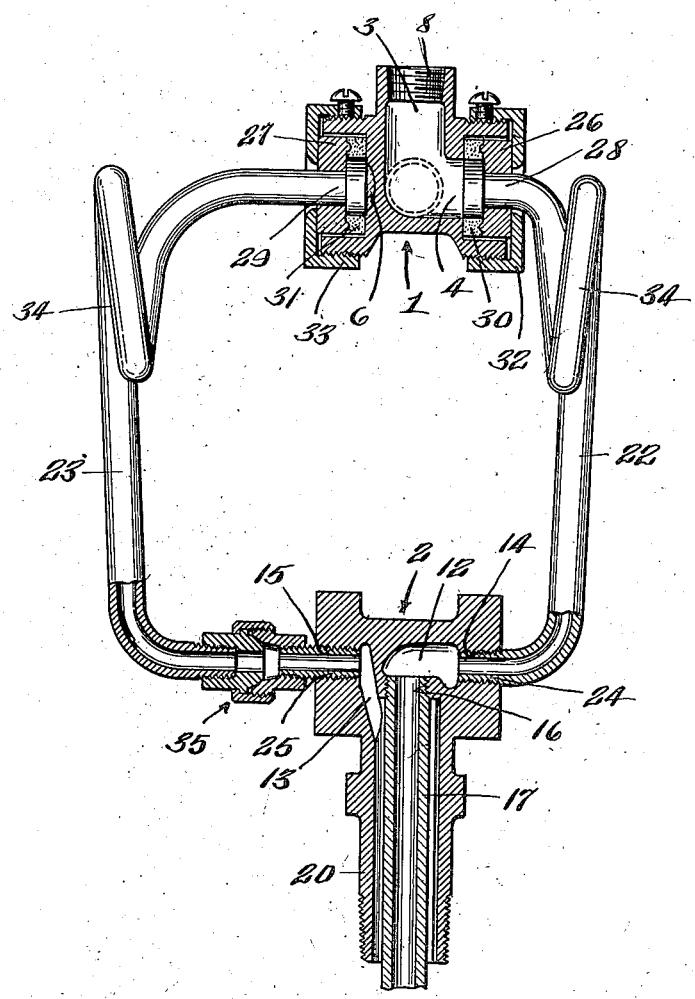

1,503,925

UNITED STATES PATENT OFFICE.

ALEXANDER JAMES SOCIA, OF SYRACUSE, NEW YORK, ASSIGNOR TO THE PROSPERITY CO. INC., OF SYRACUSE, NEW YORK, A CORPORATION OF NEW YORK.

FLEXIBLE COUPLING FOR PRESSING MACHINES.

Application filed July 23, 1920. Serial No. 398,498.

*To all whom it may concern:*

Be it known that I, ALEXANDER J. SOCIA, a citizen of the United States, and a resident of Syracuse, in the county of Onondaga and State of New York, have invented a certain new and useful Flexible Coupling for Pressing Machines, of which the following is a specification.

This invention relates to flexible couplings for conducting a fluid under pressure, as steam, to a movable part and is particularly adapted for use in connection with pressing machines of the type in Patent No. 1,252,988, issued on Jan. 8, 1918, to A. C.
Austin; and it has for its object a flexible coupling which is particularly simple in construction, consists of but few parts and has a minimum of joints at which a leakage can occur, and which joints can be readily taken up or tightened to stop any leakage that develops without necessitating the adjustment of other joints.

The invention consists of the novel features and in the combinations and constructions hereinafter set forth and claimed.

In describing this invention, reference is had to the accompanying drawings, in which like characters designate corresponding parts in all the views.

Figure 1:
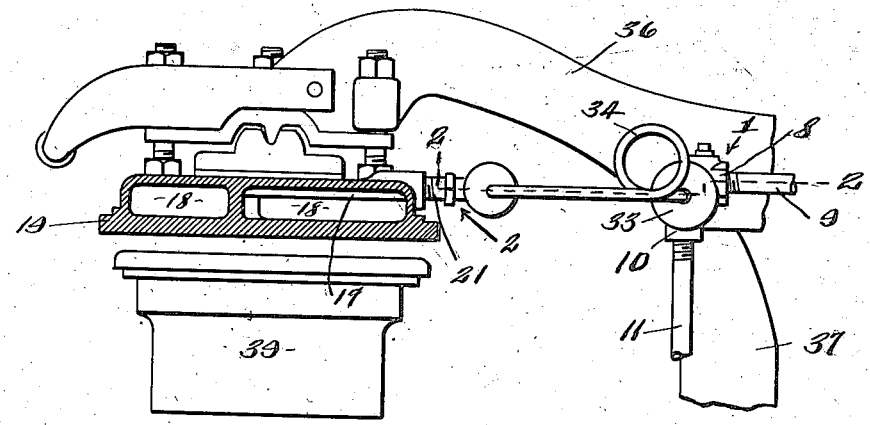

Figure 1 is a fragmentary elevation partly in section of one form of cloth or garment pressing machine embodying my invention.

Figure 2 is an enlarged sectional view taken on line 2—2 Figure 1.

Figure 3:
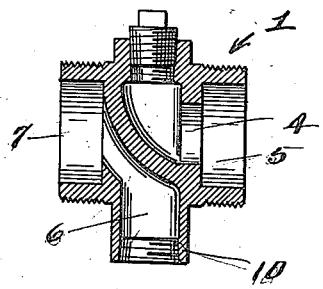

Figure 3 is a sectional view through one of the unions.

This flexible coupling comprises generally a pair of unions having passages therethrough, one of the unions being fixed and designed to be arranged in substantial coaxial alinement with a pivoted member, as the pivoted support of the pressing head of the pressing machine and the other of which is designed to be carried by, or movable relatively to, the former union, as when a movable member to which a fluid under pressure, as steam, is to be conveyed, as the pressing head, a resilient pipe connecting the passages of the unions and being connected to the one union by a swivel connection arranged substantially coaxial with the pivotal axis of the pivoted support and being rigidly connected to the other union whereby the pivoted joints are the only joints that need packing and adjustment for taking up wear of the packing.

1 and 2 designate respectively the unions, the union 1 having an inlet passage 3 provided with a lateral branch 4 arranged substantially coaxial of the union 1 and extended through the bottom of a recess 5 at one end of the union and further provided with a return passage 6 which opens at one end into a recess 7 at the other end of the union. The union 1 is also provided with a suitable radial nipple 8 for connection to the feed pipe 9 and with a nipple 10 for connection to a drain pipe 11.

The union 2 is provided with an inlet passage 12, and a return passage 13 and with threaded bores 14 and 15 communicating respectively with the passages 12 and 13. The union 2 is also provided with a radial internal threaded passage 16 for receiving a pipe 17 for conducting the fluid under pressure, as steam, to the chambers 18 and the pressing head 19 of the machine and also with a threaded nipple 20 surrounding the pipe 17 and spaced apart therefrom for connection to the drain pipe 21 also connected, or in communication with, the chambers 18 of the pressing head.

22 and 23 are conduits connecting the inlet passages 3, 12 and the return passages 13 and 6 of the unions, each conduit being connected to the union 1 by a swivel joint and being rigidly connected to the union 2, they being here shown as formed with threaded ends 24, 25, which turn into the threaded bores 14 and 15 of the unions 2. These bores 14 and 15 are preferably coaxial with the union. A swivel joint connects each pipe 22, 23, to the union 1 and comprises a head 26 or 27 on an axial portion 28 or 29, of the pipe 22, or 23, a packing 30 or 31 between the head 26 or 27 and the the bottom of the recess 5 or 7 and clamping means, as a cap 32 or 33, threaded on the end of the union 1 against the head 26 or 27. The pipes 22 and 23 are resilient but are preferably formed with coils 34 therein. Also one of the conduits 23 is formed of sections which are connected by the coupling 35 of suitable construction for facilitating the assembly of the parts.

In operation, the steam or other fluid passes from the pipe 9 through the passages 3, 4, conduit 21, passage 12, pipe 17, into the pressing head 19, and returns to the pipe 21, nipple 20, passage 13, conduit 23, passage 6, nipple 10 and drain pipe 11. During movement of the pressing head upwardly and downwardly with its support 36, which is pivoted to the upright bracket or standard 37 forming parts of the frame, the coupling swings about one axis only and any movement of the pressing head relatively to the support due to rocking of the head at 38, as it is pressed down hard upon the cloth on the lower buck 39 of the machine, which rocking is due to inequalities in the thickness of the cloth or garment, is permitted by the resiliency of the coils 34 of the conduits 22, 23. No pivotal action takes place between these conduits 22, 23, and the union 2. Heretofore, in flexible couplings used in this and similar situations, leakage develops more at one packing than at another, and hence on adjusting the packings to take up the leakages, necessitates other adjustments and it has been found difficult especially by the user of the machine to make the required adjustments at one point without upsetting adjustments at another point.

The construction of this flexible coupling is particularly advantageous in that the conduits are rigidly connected to one union and packing is used only between said conduits and the other union, so that the only adjustment necessary is at one union. Furthermore, any movement that has heretofore been provided in the fixed union, that is the union associated with the pressing head, is provided for in my coupling by the resilient conduits. Although I have shown this flexible coupling as double construction, that is, as having feed and return conduits, obviously, it may be of a single construction.

What I claim is:

1. A coupling of the class described comprising a pair of unions arranged with their axes parallel and having passages therethrough, extending in the direction of their axes, and a resilient conduit connecting the passages and connected by a swivel joint to one union and being rigidly connected to the other union, the conduit being arranged at an angle to the axes of the unions and the swivel joint being arranged coaxially with the axis of one of the unions.

2. A coupling of the class described comprising a pair of unions, each being formed with inlet and return passages, and pipe connections for said passages, a conduit connecting the inlet passages of the unions, a conduit connecting the return passages thereof, the conduits being connected to one of the unions by swivel joints and rigidly connected to the other union, substantially as and for the purpose described.

3. A flexible steam coupling of the class described comprising a pair of unions, each being formed with inlet and return passages, and pipe connections for said passages, a conduit connecting the inlet passages of the unions, a conduit connecting the return passages thereof, the conduits being connected to one of the unions by swivel joints, and rigidly connected to the other union, each being formed with a coil therein to make the same resilient, substantially as and for the purpose specified.

In testimony whereof, I have hereunto signed my name, at Syracuse, in the county of Onondaga, and State of New York, this 30th day of June, 1920.

ALEXANDER JAMES SOCIA.